Aug. 19, 1958

W. C. SCHOFIELD 2,848,214

SINTERING APPARATUS

Filed Oct. 11, 1955

INVENTOR.
WILFRED C. SCHOFIELD.
BY Ralph B. Brick
his ATTORNEY

Aug. 19, 1958 W. C. SCHOFIELD 2,848,214
SINTERING APPARATUS
Filed Oct. 11, 1955 2 Sheets-Sheet 2

INVENTOR.
WILFRED C. SCHOFIELD.
BY Ralph B. Brick
his ATTORNEY

United States Patent Office 2,848,214
Patented Aug. 19, 1958

2,848,214

SINTERING APPARATUS

Wilfred C. Schofield, Chicago, Ill., assignor to Koppers Company, Inc., a corporation of Delaware Application October 11, 1955, Serial No. 539,747

2 Claims. (Cl. 266—21)

This invention relates to apparatus for sintering ores, flue dust and the like, wherein an endless train of wheeled pallets, which have grated bottoms upon which ignited material to be sintered is carried, are moved in an upper run over upper wind box openings in order to draw air through the material to maintain combustion thereof and a lower run for return for the upper run. More particularly, this invention relates to means for providing effective sealing at the wind box openings of such apparatus as the pallets move past the openings.

One of the principal requirements in the operation of a sintering machine, particularly the continuous down draft sintering machine such as the type of the expired patents of Dwight and Lloyd, is the prevention of the access of air into the wind box chamber which air has not passed through the sintering charge of material on the pallets, the entrance of such air greatly reducing the efficiency of sintering operations. To accomplish this it has long been the practice in the endless train sintering art to suspend along the sides of the pallets of a sintering machine seal bars which are moveable freely in a vertical direction with respect to the pallets and which in the upper run rest at their lower edges by gravity upon the wearing bars or sealing surface of the wind box. Preferably, each gravity seal bar is disposed in a slot in the bottom of a pallet, the bar being held from endwise movement in the slot by rods or pins supported by the pallet and passing through spaced vertically elongated slots disposed in the bar. With such an arrangement the floatingly supported gravity seal bar runs over the seal face of the wearing bar on the wind box in the upper run so that the bars maintain a seal between the pallets and the wearing bar seal faces regardless of the vertical position or displacement of the pallet with respect to the wearing bar. However, since the seal is effected by gravity, being accomplished only by the pressure exerted by the weight of the seal bar, and since the seal bar is sometimes wedged by loose dirt or sinter when the pallet is in upside down position while in the lower run relation, effective gravity sealing of the bar at the wind box opening while in the upper run relation is not always obtained.

The present invention provides a structure which insures this effective gravity sealing by each seal bar at the wind box opening in the upper run, the structure being straight forward and economical in its assembly and maintenance and readily incorporable with present sintering machine structures. Various other features of the invention will become obvious with a reading of the disclosure set forth hereinafter.

The present invention comprises in one advantageous embodiment, a sintering machine having a wind box with an upper opening a rotatable endless train of pallets having an upper run slidable over the wind box opening in spaced relationship thereto and a lower return run, gravity sealing bars floatingly suspended from the pallet means by a pin and slot connection to seal by the pressure exerted, by the weight of the bars themselves, the space between the pallets and a sealing surface fixed relative to the wind box opening when the pallets slide over such opening, and spring pressure means acting between the pallets and the sealing bars to urge the sealing bars away from the pallets in the direction for engagement with said sealing surface in both the upper and lower runs toward wear bars to insure effective sealing of said sealing bars with said surface as the pallets enter the upper run from the lower run notwithstanding wedging in the pin and slot connection of loose sinter.

It is to be understood that various changes can be made by one skilled in the art in the arrangement, form, and construction of the apparatus disclosed without departing from the scope or spirit of the invention.

Referring to the drawings:

Figure 3 is an enlarged fragmentary side view of one of the pallets of Figure 1;

Figure 1:
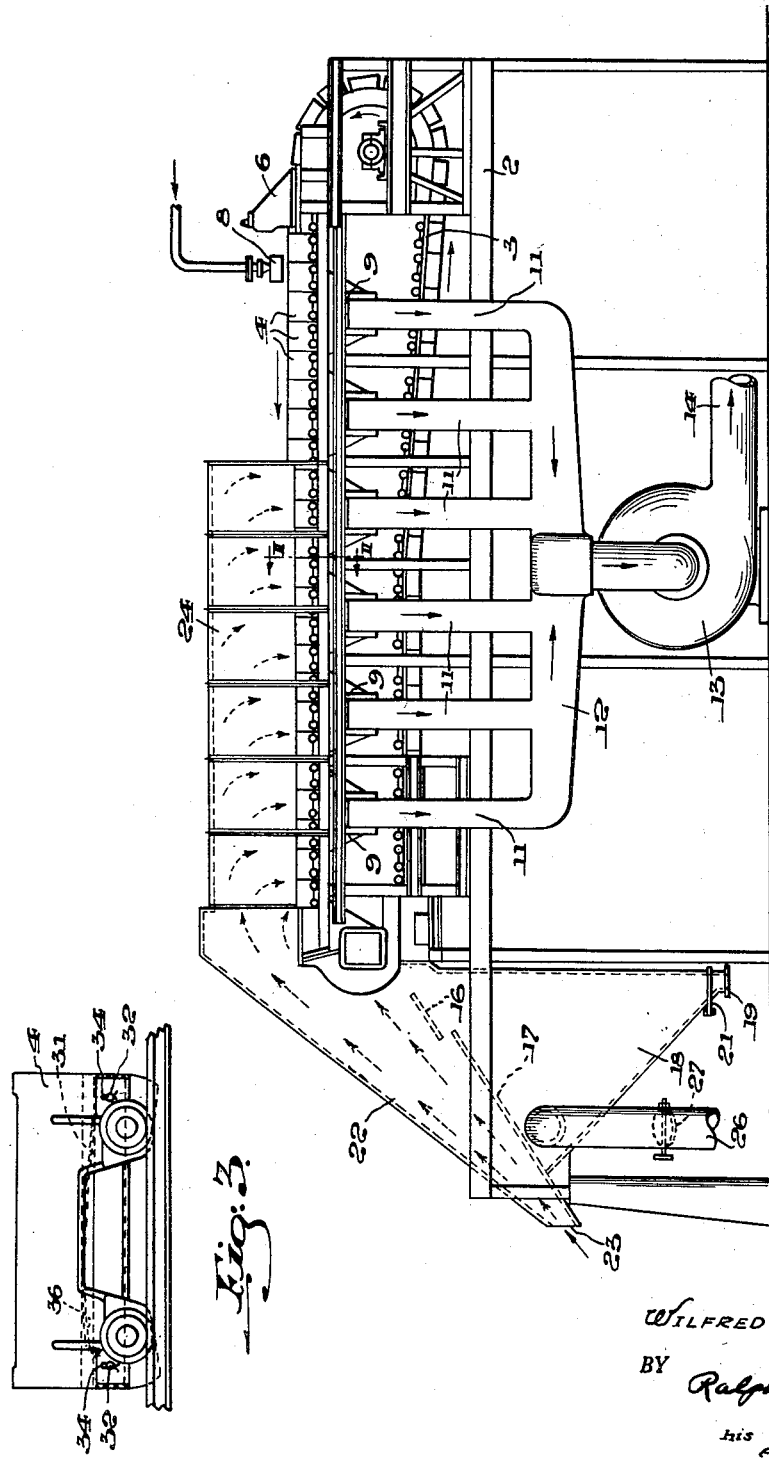
Figure 1 is a side view of a sintering machine embodying the invention.

The invention can be embodied in any one of a number of types of endless pallet sintering machines and, by way of example, is disclosed as embodied in a continuous sintering machine of the Dwight and Lloyd expired patents similar to the machine disclosed in Patent No. 2,254,323, issued to Edward W. Shallock on September 2, 1941. The construction and operation of this type of sintering machine are well known in the art and a brief description thereof will suffice. The sintering machine is shown, in Figure 1, as mounted on a suitable platform or floor 2 and comprises a suitable frame carrying an endless track 3 having an upper and a lower horizontal run upon which travel the upper run and lower run of a train of pallets 4. At the feed end of the machine the pallets are raised to their upper run position by known means from the lower run of the track about the return bend to the upper run. Each pallet carries a suitable grate 5 (Figure 2) and the pallets on the upper run of the track are in endwise contact providing a continuous traveling grate structure, the pallets being wheel mounted for travel on the track as is known. Charging chute 6 is positioned at the feed end of the machine to provide to the pallets a bed 7 of material to be sintered, the bed being supported by the grate structure and traveling therewith. The pallets pass along the upper run of track 3 from charging chute 6 to igniter 8 where the top of the bed of material 7 is ignited. During the remainder of the travel of the pallets along the upper run, they pass over wind boxes 9. These boxes are connected by conduits 11 to a manifold 12 which in turn is connected to the intake of suction fan 13, the outlet of fan 13 being connected to a conduit 14 which goes to a stack which can discharge into the atmosphere. A suitable dust collecting system can be provided between manifold 12 and fan 13 if so desired.

During the upper run travel of the pallets over wind boxes 9, air in large volume is drawn downward through the bed of material, causing down draft combustion therein from the top to the bottom of the bed so that the bed of material has been completely sintered by the time it reaches the discharge end of the machine, as is known in the art. As the pallets pass from the wind boxes to the lower run of track 3, the sinter on these pallets is discharged onto inclined guide plate 16 and then directed to screen 17 formed of grizzly bars where it is broken up to a certain extent. The fines and smaller pieces of sinter pass into bin 18 positioned below the screen and provided with a discharge spout 19 normally closed by a valve 21 of suitable type. Positioned above the screen 17 is a casing 22 which is provided with discharge spout 23 through which the larger pieces of sinter pass from the inclined screen 17. A hood 24 connects to the upper end of the casing 22 and extends over a portion of the upper run of pellets on the conveyor means. As is known in the art and as can be seen in Figure 2, sealing bars 25 are provided for effecting substantially airtight seals between the side walls of hood 24 and the sides of pallets 4.

The fan 13 is of sufficient capacity to handle the required volume of air, causing the air to enter into the casing 22 through the spout 23 and through the conduit 26 connected for example to dust areas in other parts of the sinter plant. A damper 27 is provided in conduit 26 for controlling the airflow therethrough. The air passes over the sinter that is moving toward discharge spout 23 to cool this sinter and to remove therefrom the dust and fine particles of material which otherwise would be discharged therewith, the suction fan causing these fine particles of material to be returned to the bed of material 7 for full utilization thereof. The apparatus so far described is conventional in the sintering art and it is to be understood that the inventive structure described hereinafter is not limited in its application to the specific endless track sintering machine embodiment disclosed but can be readily incorporated in any one of a number of other well known types of endless track sintering machines.

Figure 2:
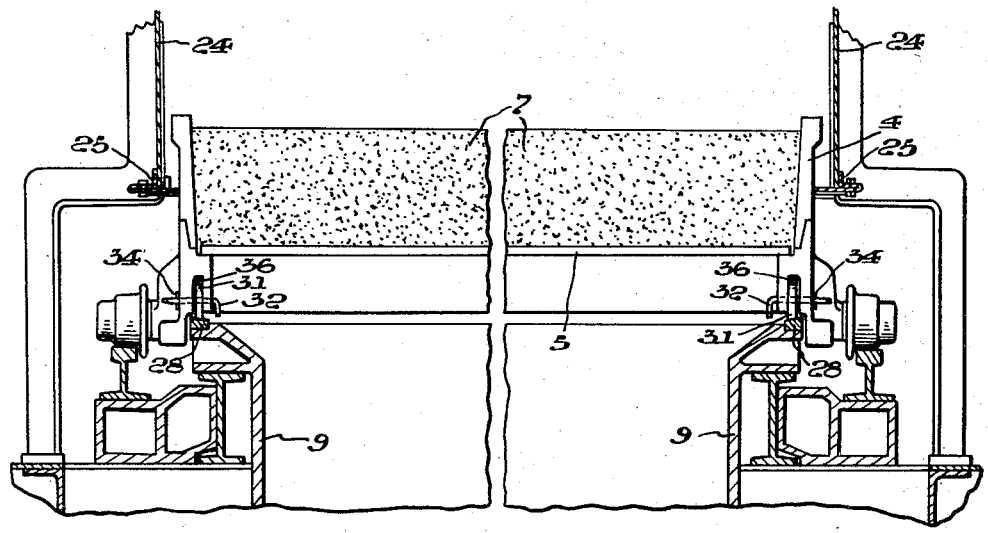
Figure 2 is an enlarged fragmentary sectional view of the machine of Figure 1, taken in a plane which passes through the line II—II of Figure 1.

Referring to Figures 2 and 3 of the drawings, it can be seen that the whole length of the row of wind box tops 9 is fitted at either side with a rectangular wearing bar 28. These wearing bars 28 constitute the fixed member of the sliding joint which is maintained between the pallets 4 and the wind boxes 9 as the pallets pass over the openings of such boxes. As is well known in the art and therefore not disclosed in detail, dead plates are provided at either end of the row of wind boxes over which the whole width of the pallet slides to prevent leakage of air at these points.

In the under surfaces of the pallets are formed parallel, spaced longitudinal recesses or slots 29 into which fit the gravity seal bars 31. In their simplest embodiment these seal bars are comprised of rectangular plates or bars of the same length as the pallet and fit into the aforementioned recesses 29 with only sufficient clearance to permit of free vertical movement therein. To prevent the seal bars from endwise movement in the pallets, they are held by rods or pins 32 projecting transversely through the walls of the pallets and passing through vertically elongated slots 33 in the bars. Cotter pins 34 passing through the rods 32 serve to hold them in position.

In the past, seal bars such as above described have depended upon the influence of their own weight only, to effect a gravity seal between themselves and the wearing bars fixed to the wind box tops in the upper run, the sealing pressure being merely that exerted by the weight of the bar hence, when the pallets were in the lower run of the track, the seal bars readily dropped by gravity to have the extremes of the upper ends of the elongated slots nearest the sealing edge of bars 31 engage the pins 32 in the lower run, and loose sinter sometimes wedged between the seal bar at the lower end of the slot 33 remote from said sealing edge and the pins 32 when in such position and preventing the seal bars when returning to the upper run from falling downward by gravity into sealing position or contact with their wear bars 28 as the pallets passed over the entrance end of the wearing bars 28 at the feed end 6 of the machine, as the pallets enter the upper run to move over the wind box openings.

Figure 4:
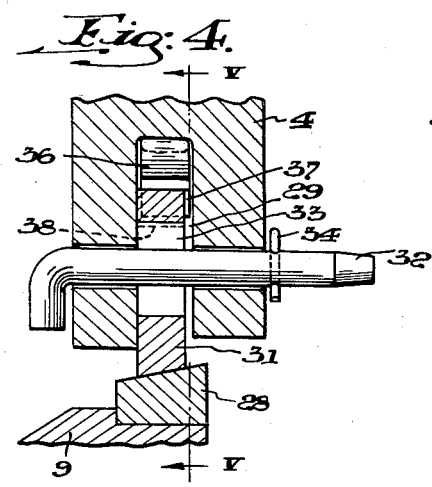
Figure 4 is an enlarged fragmentary sectional view of the novel sealing means in the upper run position as shown on the right hand portion of Figure 2.
Figure 5:
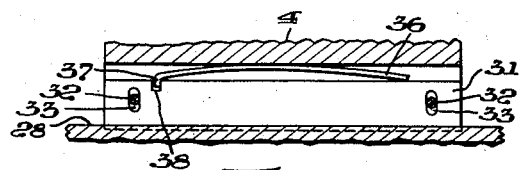
Figure 5 is a fragmentary sectional view of the sealing means on a somewhat reduced scale from Figure 4, taken in a plane which passes through the line V—V of Figure 4.

To insure effective sealing of such bars, continuous pressure means which can be in the form of leaf springs 36 such as that disclosed in Figures 3 and 4 are interposed so as to be between the top surface of such seal bar 31 and the bottom surface of each slot 29 in the upper run of the pallets 4. These springs each have a depending edge portion 37 which engages in a slot 38 in the bar 31. Thus, the springs constantly urge the seal bars and move the entire weight of the gravity seal bars away from the pallets to insure the sealing of the space between the pallets and the wind box openings when the pallets move past the openings in the upper run and to prevent wedging of the bars as heretofore by loose sinter between the pins 32 and the lower end of the slot 33 remote from the sealing edge of bars 31 when the pallets are in upsidedown position (Fig. 9). In this position the bars 31 are now urged away from the pallets in the direction of contact with the wearing bars 28, where the pallets turn from the lower run, being supported by the springs 36 so as to leave an open space between the pins and the upper end of the slot 33 closest to the sealing edge of the bar 31, instead being suspended by gravity from the pins 32 at that end of the slot to leave an open space between the pins and the lower end of the slot 33 remote from the sealing edge of the bar 31 as heretofore occurred in the operation of these bars 31 solely by gravity. Hence the bars 31 actually contact the wearing bars 28 as the pallets turn at the feed end 6 to enter the upper run. Any cinder or stickers are then lodged between the pins 32 and the lower end of slots 33, as seen in Fig. 4, which is closest to the sealing edge of bar 31, rather than between the pin and the upper end of the slot 33 remote from the sealing edge, as heretofore occurred with solely gravity sealing. Heretofore, with the stickers in the latter posiiton between the pin and the upper end of slot 33, such stickers raised the bar 31 to an elevation above and out of contact with the wear bar 28. If the stickers were stronger than the weight of the gravity bars 31, which are of less weight than the pallets, the bar could not drop down by its own weight to the intermediate position of pin 32, as seen in Figs. 5 to 8, to effect the seal by contact with the wear bar 28.

With the new mode of operation of these bars 31, the spring 36 acts to move the bars 31 away from the pallets in the lower run, as seen in Fig. 9, for contact of the sealing edges of the bars 31 with the wear bar 28. As the pallets enter the upper run, the wear bar 28 acts as a cam to force the seal bars 31 upwardly. This upward movement is resisted by the sticker between the lower end of slot 33 and the pin 32 in the upper run, as pin 32 is on the pallet and movement of the sticker upwardly would require lifting of the pin 32, which does not take place since pin 32 is under the greater weight of the pallet. As a consequence, the cam action of the wear bar 28 acts on the seal bar 31 to exert a crunching or grinding force on the sticker against the pin 32 and the weight of the pallet, so that the sticker is thereby crumbled, allowing the sealing bar 31 to resume its normal relation in the upper run, with the pin 32 at the normal intermediate level, as shown in Figs. 4 to 8.

In this manner the spring when used with the sealing weight of these bars 31, as normally used in these gravity sealing bars 31, eliminates the defect in sealing due to stickers in their slots as heretofore obtained with the prior art use of bars of a weight to seal by gravity under the influence of their own weight.

Figure 6:
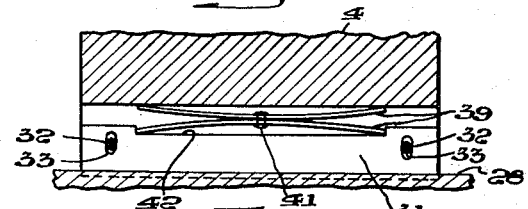
Figures 6–8 are fragmentary sectional views of various modified sealing means which can be used to cooperate with the wearing bars of the wind boxes taken in planes similar to Figure 5.
Figure 8:
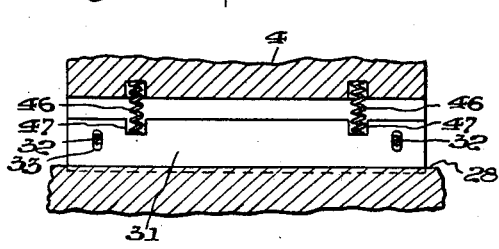
Figure 7:
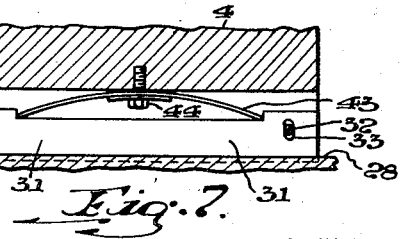
Figure 9:
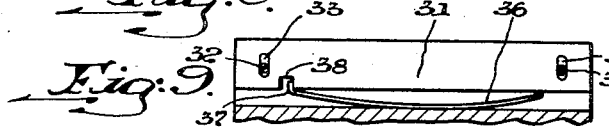
Figure 9 is a fragmentary sectional view of the position of the sealing means, similar to that of Figure 5, only in the lower run position disclosing the new mode of operation of the sealing means when the pallet is in upside down position during the lower run.

As can be seen in Figures 6-8, various types of pressure means can be used. In Figure 6, two oppositely curved leaf spring elements 39 are disclosed in fastened face-to-face relationship, a rivet 41 being used to accomplish the fastening of the springs. To accommodate such a spring, the sealing bar is provided with a longitudinally extending recess 42 as shown.

In Figure 7, only one curved leaf spring 43 similar to that disclosed in Fig. 6 is used to cooperate with a longitudinally extending recess in the seal bar, the spring being fastened to the pallet itself by stud bolt and washer arrangement 44.

In Figure 8, two spaced helical compression springs 46 are provided to cooperate with aligned, spaced slots 47 in the seal bar to urge the bar away from the pallet.

From the structures disclosed it can be seen readily that any one of the inventive pressure urged seal bar arrangements described can be installed on most presently existing endless track sintering machines with a minimum of cost, effort, and time to greatly enhance the sealing effect of the seal bars and thus the sintering efficiency of the machines with which they are used.

The invention claimed is:

1. A continuous sintering machine comprising: an endless track having an upper and lower run; a wind box having an upper opening adjacent the upper run of said track and a seal wearing bar fixed relative to said opening; an endless train of pallets adapted to ride along the runs of said track past said wind box opening in the upper run; gravity seal bars floatingly suspended from said pallets by a pin and slot connection and of a weight to seal by their own weight by gravity on said seal wearing bar in the upper run; and yieldable spring pressure means in an intermediate relation, between said pallets and said gravity seal bars, to constantly urge said seal bars in both runs of said track away from said pallets in a direction to contact said seal wear bars, to prevent sticking of said bars by cinder in the pin and slot connection between the pin and the end of the slot remote from the sealing edge of the gravity seal bars.

2. A continuous sintering machine comprising: an endless track having an upper and lower run; a wind box having an upper opening along the upper run of the track; an endless train of pallets ridable along the upper and lower runs of said track and across said wind box opening in the upper run; a sealing wear bar fixed relative to said wind box opening; gravity sealing seal bars floatingly suspended on each of said pallets by a pin and slot connection therebetween, with the bars of a weight to seal on the sealing wear bars of their own weight under the action of gravity; and springs positioned intermediate said pallets and said seal bars in constantly urging relation with said seal bars to move the entire weight of the seal bars away from said pallets, in both the upper and lower runs, to prevent sticking of cinder between the pins and the ends of the slots, of the pin and slot connection, that are remote from the sealing edge of the sealing bars, to insure sealing by the seal bars on the wearing bars when said pallets move past said wind box opening in the upper run.

References Cited in the file of this patent

UNITED STATES PATENTS

| | | |
|---|---|---|
| 1,140,710 | Plock | May 25, 1915 |
| 1,197,199 | Gayley | Sept. 5, 1916 |
| 1,491,778 | Stehli | Apr. 22, 1924 |
| 2,710,183 | Urban | June 7, 1955 |